(No Model.)
F. M. PRIESTLEY.
VEHICLE WHEEL.
No. 311,144. Patented Jan. 20, 1885.
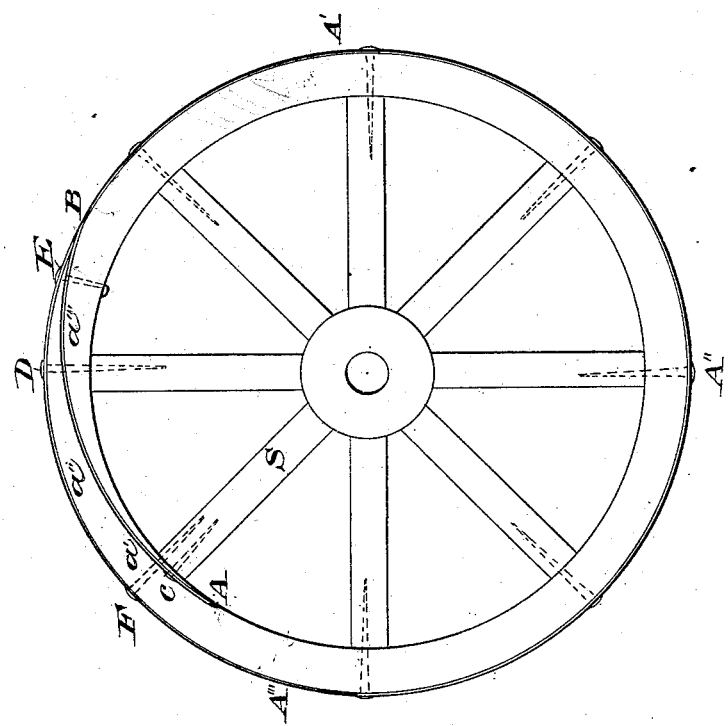
Witnesses:
C. H. Gleason
Fred Fuller
Inventor:
Forrest M Priestley

UNITED STATES PATENT OFFICE.

FORREST M. PRIESTLEY, OF GRAND RAPIDS, MICHIGAN.

VEHICLE-WHEEL.

SPECIFICATION forming part of Letters Patent No. 311,144, dated January 20, 1885.

Application filed June 2, 1884. (No model.)

*To all whom it may concern:*

Be it known that I, FORREST M. PRIESTLEY, of Grand Rapids, in the county of Kent and State of Michigan, have invented a new and useful Improvement in Wheels for Vehicles; and I do hereby declare that the following is a full, clear, and exact description of the same.

My invention is chiefly useful in its application to wheels for light vehicles and toy wagons.

In the accompanying drawing, A' A'' A''' represents the felly and tire of the wheel in place. The two ends of the felly are joined with a lap, $a'$ $a''$ $a'''$.

In the construction of the wheel the metallic tire is placed over and upon the end of the felly, thinned to form the lap at A, and is fastened by the small nail C, driven through both the tire and the thin end of the felly into the spoke S. The tire follows the course of the lap along $a'$ $a''$ $a'''$, thence around the wheel to the other end of the felly at B, and is there firmly secured by the clinched nail or rivet E, the whole lap being further secured to the spokes by the nails D F. The lap may be of any desired length.

The advantages to be obtained by running the end of the metal tire between the lapped ends of the felly are, first, greater strength and stiffness in the felly along the lap; second, the metallic tire on the end of the felly (thinned to form the lap) prevents the splitting of the end of the felly when bending the same onto the spokes; third, by the use of proper machinery it may be done in one operation—the bending of the felly, the putting the felly onto the spokes, and the putting the tire upon the wheel. The same advantages as to strength of construction of the lap and the prevention of splitting of the felly may be obtained by inserting between the two lapped ends of the felly a separate strip of metal instead of a part of the tire. The felly, other than the lap, is fastened to each spoke, in the usual manner, with nails or screws.

What I claim as new, and desire to secure by Letters Patent, is—

1. A vehicle-wheel having a metallic tire, with one end of the same or other strip of metal inserted between the two halves of the lap $a'$ $a''$ $a'''$, substantially as shown.

2. In a vehicle-wheel, the combination of the metallic tire or other strip of metal and the felly, the metallic tire or other strip of metal being inserted between the lapped ends of the felly, and all fastened together and to the spokes, substantially as described.

FORREST M. PRIESTLEY.

Witnesses:
GEORGE S. BUCHER,
CLARK H. GLEASON.